UNITED STATES PATENT OFFICE.

HAROLD JOSEPH WHEATON, OF NEAR WARRINGTON, ENGLAND, ASSIGNOR TO JOSEPH CROSFIELD AND SONS, LIMITED, OF WARRINGTON, ENGLAND.

BASE-EXCHANGE COMPOUND AND PROCESS OF MAKING THE SAME.

1,381,777. Specification of Letters Patent. Patented June 14, 1921.

No Drawing. Application filed November 6, 1919. Serial No. 336,060.

*To all whom it may concern:*

Be it known that I, HAROLD JOSEPH WHEATON, a subject of the King of Great Britain, residing at 5 Walton New Road, near Warrington, in the county of Chester, England, have invented a new and useful Base-Exchange Compound and Process of Making the Same, of which the following is a specification.

Compounds containing silica and soda with alumina, or other bases, have been manufactured and used for purifying and softening water.

According to this invention a hydrous compound of silica and soda alone, without other bases, is prepared in such a manner that it is insoluble and porous and is capable of exchanging its alkaline compound and is therefore suitable for use for purifying, or softening, or both purifying and softening, water.

The said compound is prepared by taking a dilute solution of silicate of soda and a mineral acid is added thereto in such quantity as to neutralize part of the soda. The proportion of soda removed by thus neutralizing with the acid may vary, say between 20 and 80 per cent. of the original quantity present; but, for most purposes, the removal of about fifty per cent. gives the best results. After the addition of the acid the solution becomes a gelatinous mass and this is dried slowly at a low temperature. The dried mass is washed with water to free it from the excess of soluble salts it, during such washing, breaking up into hard transparent grains and then being ready for use.

The following is an example of how this invention can be performed; but I do not limit myself thereto.

10 liters of a solution of silicate of soda, containing about 1.86 per cent. of $Na_2O$ and 6.4 per cent. of $SiO_2$, are mixed with 550 cubic centimeters of hydrochloric acid of 1.1 density and the mixture is allowed to gelatinize and then it is dried slowly at a low temperature and is washed with water so as to free it from the excess of soluble salts and cause it to break up into hard transparent grains.

The approximate composition of the product thus obtained is 12.6 per cent. of $Na_2O$ and 87.4 per cent. of $SiO_2$ calculated as the dry material.

What I claim is:

1. A process which comprises partially neutralizing with mineral acid a solution of silicate of soda, drying the resultant gelatinous mass and washing the dried mass to free it of any excess of soluble salts, and to render it suitable for use as a water purifier and softener.

2. A process which comprises partially neutralizing with mineral acid a solution of silicate of soda, drying the resultant gelatinous mass and washing the dried mass to free it of any excess of soluble salts, and recovering the hard, transparent grains thus formed for use as a water purifier and softener.

3. A process which comprises subjecting a dilute solution of silicate of soda to the action of a mineral acid to neutralize from 20% to 80% of the soda present, slowly drying the resultant gelatinous mass at low temperature, and washing the dried mass to free it from any excess of soluble salts and recovering the resultant hard, transparent, porous grains for use as a water purifier and softener.

4. As a new product for softening and purifying water, hard, transparent grains of silicate of soda having a composition approximating 12.6% of $Na_2O$ and 87.4% of $SiO_2$ calculated as the dry material.

In testimony whereof I have signed my name to this specification in the presence of two subscribing witnesses.

HAROLD JOSEPH WHEATON.

Witnesses:
WILLIAM L. CRAWFORD,
JAMES TABERNACLE.